US008879831B2

(12) United States Patent
Kohli et al.

(10) Patent No.: US 8,879,831 B2
(45) Date of Patent: Nov. 4, 2014

(54) USING HIGH-LEVEL ATTRIBUTES TO GUIDE IMAGE PROCESSING

(75) Inventors: Pushmeet Kohli, Cambridge (GB); Jamie Daniel Joseph Shotton, Cambridge (GB); Min Sun, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 13/327,464

(22) Filed: Dec. 15, 2011

(65) Prior Publication Data

US 2013/0156298 A1 Jun. 20, 2013

(51) Int. Cl.
G06K 9/00 (2006.01)
G06K 9/62 (2006.01)
G06K 9/68 (2006.01)

(52) U.S. Cl.
USPC .............................. 382/159; 382/153; 382/226

(58) Field of Classification Search
USPC .......................................... 382/159, 153, 226
See application file for complete search history.

(56) References Cited

U.S. PATENT DOCUMENTS

| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |

(Continued)

FOREIGN PATENT DOCUMENTS

| CN | 201254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Kathleen Dulaney
(74) *Attorney, Agent, or Firm* — Steve Wight; Judy Yee; Micky Minhas

(57) ABSTRACT

Using high-level attributes to guide image processing is described. In an embodiment high-level attributes of images of people such as height, torso orientation, body shape, gender are used to guide processing of the images for various tasks including but not limited to joint position detection, body part classification, medical image analysis and others. In various embodiments one or more random decision forests are trained using images where global variable values such as player height are known in addition to ground-truth data appropriate for the image processing task concerned. In some examples sequences of images are used where global variables are static or vary smoothly over the sequence. In some examples one or more trained random decision forests are used to find global variable values as well as output values for the task concerned such as joint positions or body part classes.

20 Claims, 11 Drawing Sheets

(56) References Cited

U.S. PATENT DOCUMENTS

| | | | |
|---|---|---|---|
| 4,893,183 | A | 1/1990 | Nayar |
| 4,901,362 | A | 2/1990 | Terzian |
| 4,925,189 | A | 5/1990 | Braeunig |
| 5,101,444 | A | 3/1992 | Wilson et al. |
| 5,148,154 | A | 9/1992 | MacKay et al. |
| 5,184,295 | A | 2/1993 | Mann |
| 5,229,754 | A | 7/1993 | Aoki et al. |
| 5,229,756 | A | 7/1993 | Kosugi et al. |
| 5,239,463 | A | 8/1993 | Blair et al. |
| 5,239,464 | A | 8/1993 | Blair et al. |
| 5,288,078 | A | 2/1994 | Capper et al. |
| 5,295,491 | A | 3/1994 | Gevins |
| 5,320,538 | A | 6/1994 | Baum |
| 5,347,306 | A | 9/1994 | Nitta |
| 5,385,519 | A | 1/1995 | Hsu et al. |
| 5,405,152 | A | 4/1995 | Katanics et al. |
| 5,417,210 | A | 5/1995 | Funda et al. |
| 5,423,554 | A | 6/1995 | Davis |
| 5,454,043 | A | 9/1995 | Freeman |
| 5,469,740 | A | 11/1995 | French et al. |
| 5,495,576 | A | 2/1996 | Ritchey |
| 5,516,105 | A | 5/1996 | Eisenbrey et al. |
| 5,524,637 | A | 6/1996 | Erickson et al. |
| 5,534,917 | A | 7/1996 | MacDougall |
| 5,563,988 | A | 10/1996 | Maes et al. |
| 5,577,981 | A | 11/1996 | Jarvik |
| 5,580,249 | A | 12/1996 | Jacobsen et al. |
| 5,594,469 | A | 1/1997 | Freeman et al. |
| 5,597,309 | A | 1/1997 | Riess |
| 5,616,078 | A | 4/1997 | Oh |
| 5,617,312 | A | 4/1997 | Iura et al. |
| 5,638,300 | A | 6/1997 | Johnson |
| 5,641,288 | A | 6/1997 | Zaenglein |
| 5,682,196 | A | 10/1997 | Freeman |
| 5,682,229 | A | 10/1997 | Wangler |
| 5,690,582 | A | 11/1997 | Ulrich et al. |
| 5,703,367 | A | 12/1997 | Hashimoto et al. |
| 5,704,837 | A | 1/1998 | Iwasaki et al. |
| 5,715,834 | A | 2/1998 | Bergamasco et al. |
| 5,875,108 | A | 2/1999 | Hoffberg et al. |
| 5,877,803 | A | 3/1999 | Wee et al. |
| 5,913,727 | A | 6/1999 | Ahdoot |
| 5,933,125 | A | 8/1999 | Fernie |
| 5,980,256 | A | 11/1999 | Carmein |
| 5,989,157 | A | 11/1999 | Walton |
| 5,995,649 | A | 11/1999 | Marugame |
| 6,005,548 | A | 12/1999 | Latypov et al. |
| 6,009,210 | A | 12/1999 | Kang |
| 6,054,991 | A | 4/2000 | Crane et al. |
| 6,066,075 | A | 5/2000 | Poulton |
| 6,072,494 | A | 6/2000 | Nguyen |
| 6,073,489 | A | 6/2000 | French et al. |
| 6,077,201 | A | 6/2000 | Cheng et al. |
| 6,098,458 | A | 8/2000 | French et al. |
| 6,100,896 | A | 8/2000 | Strohecker et al. |
| 6,101,289 | A | 8/2000 | Kellner |
| 6,128,003 | A | 10/2000 | Smith et al. |
| 6,130,677 | A | 10/2000 | Kunz |
| 6,141,463 | A | 10/2000 | Covell et al. |
| 6,147,678 | A | 11/2000 | Kumar et al. |
| 6,152,856 | A | 11/2000 | Studor et al. |
| 6,159,100 | A | 12/2000 | Smith |
| 6,173,066 | B1 | 1/2001 | Peurach et al. |
| 6,181,343 | B1 | 1/2001 | Lyons |
| 6,188,777 | B1 | 2/2001 | Darrell et al. |
| 6,215,890 | B1 | 4/2001 | Matsuo et al. |
| 6,215,898 | B1 | 4/2001 | Woodfill et al. |
| 6,226,396 | B1 | 5/2001 | Marugame |
| 6,229,913 | B1 | 5/2001 | Nayar et al. |
| 6,256,033 | B1 | 7/2001 | Nguyen |
| 6,256,400 | B1 | 7/2001 | Takata et al. |
| 6,283,860 | B1 | 9/2001 | Lyons et al. |
| 6,289,112 | B1 | 9/2001 | Jain et al. |
| 6,299,308 | B1 | 10/2001 | Voronka et al. |
| 6,308,565 | B1 | 10/2001 | French et al. |
| 6,316,934 | B1 | 11/2001 | Amorai-Moriya et al. |
| 6,363,160 | B1 | 3/2002 | Bradski et al. |
| 6,384,819 | B1 | 5/2002 | Hunter |
| 6,411,744 | B1 | 6/2002 | Edwards |
| 6,430,997 | B1 | 8/2002 | French et al. |
| 6,476,834 | B1 | 11/2002 | Doval et al. |
| 6,496,598 | B1 | 12/2002 | Harman |
| 6,503,195 | B1 | 1/2003 | Keller et al. |
| 6,539,931 | B2 | 4/2003 | Trajkovic et al. |
| 6,570,555 | B1 | 5/2003 | Prevost et al. |
| 6,633,294 | B1 | 10/2003 | Rosenthal et al. |
| 6,640,202 | B1 | 10/2003 | Dietz et al. |
| 6,661,918 | B1 | 12/2003 | Gordon et al. |
| 6,681,031 | B2 | 1/2004 | Cohen et al. |
| 6,714,665 | B1 | 3/2004 | Hanna et al. |
| 6,731,799 | B1 | 5/2004 | Sun et al. |
| 6,738,066 | B1 | 5/2004 | Nguyen |
| 6,765,726 | B2 | 7/2004 | French et al. |
| 6,788,809 | B1 | 9/2004 | Grzeszczuk et al. |
| 6,801,637 | B2 | 10/2004 | Voronka et al. |
| 6,873,723 | B1 | 3/2005 | Aucsmith et al. |
| 6,876,496 | B2 | 4/2005 | French et al. |
| 6,937,742 | B2 | 8/2005 | Roberts et al. |
| 6,950,534 | B2 | 9/2005 | Cohen et al. |
| 7,003,134 | B1 | 2/2006 | Covell et al. |
| 7,036,094 | B1 | 4/2006 | Cohen et al. |
| 7,038,855 | B2 | 5/2006 | French et al. |
| 7,039,676 | B1 | 5/2006 | Day et al. |
| 7,042,440 | B2 | 5/2006 | Pryor et al. |
| 7,050,606 | B2 | 5/2006 | Paul et al. |
| 7,058,204 | B2 | 6/2006 | Hildreth et al. |
| 7,060,957 | B2 | 6/2006 | Lange et al. |
| 7,113,918 | B1 | 9/2006 | Ahmad et al. |
| 7,121,946 | B2 | 10/2006 | Paul et al. |
| 7,170,492 | B2 | 1/2007 | Bell |
| 7,184,048 | B2 | 2/2007 | Hunter |
| 7,202,898 | B1 | 4/2007 | Braun et al. |
| 7,222,078 | B2 | 5/2007 | Abelow |
| 7,227,526 | B2 | 6/2007 | Hildreth et al. |
| 7,259,747 | B2 | 8/2007 | Bell |
| 7,308,112 | B2 | 12/2007 | Fujimura et al. |
| 7,317,836 | B2 | 1/2008 | Fujimura et al. |
| 7,348,963 | B2 | 3/2008 | Bell |
| 7,359,121 | B2 | 4/2008 | French et al. |
| 7,367,887 | B2 | 5/2008 | Watabe et al. |
| 7,379,563 | B2 | 5/2008 | Shamaie |
| 7,379,566 | B2 | 5/2008 | Hildreth |
| 7,389,591 | B2 | 6/2008 | Jaiswal et al. |
| 7,412,077 | B2 | 8/2008 | Li et al. |
| 7,421,093 | B2 | 9/2008 | Hildreth et al. |
| 7,430,312 | B2 | 9/2008 | Gu |
| 7,436,496 | B2 | 10/2008 | Kawahito |
| 7,450,736 | B2 | 11/2008 | Yang et al. |
| 7,452,275 | B2 | 11/2008 | Kuraishi |
| 7,460,690 | B2 | 12/2008 | Cohen et al. |
| 7,489,812 | B2 | 2/2009 | Fox et al. |
| 7,536,032 | B2 | 5/2009 | Bell |
| 7,555,142 | B2 | 6/2009 | Hildreth et al. |
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |

(56) References Cited

U.S. PATENT DOCUMENTS

| | | |
|---|---|---|
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 2008/0026838 A1 | 1/2008 | Dunstan et al. |
| 2008/0075367 A1 | 3/2008 | Winn |
| 2009/0154796 A1 | 6/2009 | Gupta et al. |
| 2010/0111370 A1 | 5/2010 | Black et al. |
| 2010/0195867 A1 | 8/2010 | Kipman |
| 2010/0278384 A1* | 11/2010 | Shotton et al. ............... 382/103 |
| 2011/0033122 A1 | 2/2011 | Le Roux |
| 2011/0188715 A1* | 8/2011 | Shotton et al. ............... 382/128 |
| 2011/0228976 A1 | 9/2011 | Fitzgibbon |
| 2012/0045120 A1* | 2/2012 | Tate et al. ..................... 382/159 |
| 2012/0106800 A1* | 5/2012 | Khan et al. .................... 382/104 |
| 2012/0106854 A1* | 5/2012 | Tang et al. .................... 382/224 |
| 2012/0224744 A1* | 9/2012 | Perbet et al. .................. 382/103 |
| 2012/0321174 A1* | 12/2012 | Tsymbal et al. ............... 382/159 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Leonid Sigal, Continuous-state Graphical Models for Object Localization, Pose Estimation and Tracking, Department of Computer Science at Brown University, Providence, Rhode Island, May 2008.

Pedro F. Felzenswalb and Daniel P. Huttenlocher, Pictorial Structures for Object Recognition, IJCV, 2005.

Tian, et al., "Latent Gaussian Mixture Regression for Human Pose Estimation", In Proceedings of the 10th Asian Conference on Computer Vision, vol. Part III, 2010, pp. 679-690.

Kanaujia, Atul, "Conditional Models for 3D Human Pose Estimation", In a Dissertation Submitted to the Graduate School, New Brunswick Rutgers in Partial Fulfillment of the Requirements for the Degree of Doctor of Philosophy Graduate Program in Computer Science, Jan. 2010, 206 pages.

Zhao, et al., "Human Motion Tracking by Temporal-Spatial Local Gaussian Process Experts", In Proceedings of IEEE Transactions on Image Processing, vol. 20, Issue 4, Apr. 2011, pp. 1141-1151.

Wang, et al., "Boosted Multiple Deformable Trees for Parsing Human Poses", In Proceedings of ICCV Workshop on Human Motion Understanding, Modeling, Capture and Animation, Oct. 20, 2007, pp. 16-27.

Bourdev, et al., "Poselets: Body Part Detectors Trained Using 3D Human Pose Annotations", In Proceedings of IEEE 12th International Conference on Computer Vision, Sep. 29-Oct. 2, 2009, pp. 1365-1372.

Agarwal, A. et al. 3D human pose from silhouettes by relevance vector regression. In Proc. CVPR, 2004.

Andriluka, M. et al. Pictorial structures revisited: People detection and articulated pose estimation. In Proc. CVPR, 2009.

Comaniciu, D. et al. Mean shift: A robust approach toward feature space analysis. PAMI 2002.

Eichner, M. et al. Better appearance models for pictorial structures. In Proc. BMVC, 2009.

Felzenszwalb, P. et al. Object detection with discriminatively trained part based models. PAMI, 2010.

Gall, J. et al. Hough forests for object detection, tracking, and action recognition. PAMI, 33(11):2188-2202, 2011.

Ganapathi, V. et al. Real time motion capture using a single time-of-flight camera. In Proc. CVPR, 2010.

(56) References Cited

OTHER PUBLICATIONS

Girshick, R. et al. Efficient regression of general-activity human poses from depth images. In Proc. ICCV, 2011.
Grest, D. et al. Nonlinear body pose estimation from depth images. In Proc. DAGM, 2009.
Kanaujia, A. et al. Semi-supervised hierarchical models for 3D human pose reconstruction. In Proc. CVPR, 2007.
Knoop, S. et al. Sensor fusion for 3D human body tracking with an articulated 3D body model. In Proc. ICRA, 2006.
Leistner, C. et al. Semi-supervised random forests. In ICCV, 2009.
Lepetit, V. et al. Randomized trees for real-time keypoint recognition. In Proc. CVPR, 2005.
Moeslund, T. et al. A survey of advances in vision-based human motion capture and analysis. CVIU, 2006.
Montillo, A. et al. Entangled decision forests and their application for semantic segmentation of ct images. In IPMI, pp. 184-196, 2011.
Navaratnam, R. et al. The joint manifold model for semi-supervised multi-valued regression. In Proc. ICCV, 2007.
Nowonzin, S. et al. Decision tree fields. ICCV 2011.
Plagemann, C. et al. Real-time identification and localization of body parts from depth images. In Proc. ICRA, 2010.
Poppe, R. Vision-based human motion analysis: An overview. CVIU, 2007.
Ramanan, D. et al. Strike a pose: Tracking people by finding stylized poses. In Proc. CVPR, 2005.
Wang, R. et al. Real-time hand-tracking with a color glove. In Proc. ACM SIGGRAPH, 2002.
Shotton, R. et al. Real-time human pose recognition in parts from a single depth image. In Proc. CVPR, 2011.
Siddiqui, M. et al. Human pose estimation from a single view point, real-time range sensor. In CVCG at CVPR, 2010.
Sidenbladh, H. et al. Implicit probabilistic models of human motion for synthesis and tracking. In Proc. ECCV, 2002.
Urtasun, R. et al. Local probabilist regression for activity-independent human pose inference. In Proc. CVPR, 2008.

\* cited by examiner

USING HIGH-LEVEL ATTRIBUTES TO GUIDE IMAGE PROCESSING

BACKGROUND

Image processing tasks include automated image editing tasks such as in-painting, and de-noising as well as computer vision tasks which typically involve processing images captured from the real world in order to interpret the information in those images. An example is calculating joint positions in images of people in order to understand how a person, such as someone playing a computer game, is oriented and positioned in an environment. Computer vision tasks, such as calculating a person's joint positions or other features of an image is useful for many application including but not limited to: computer games, augmented reality, human-computer interaction, sensing and control applications, robotics, medical applications and others.

Existing approaches to joint position estimation typically comprise identifying body parts in images of a person by using trained machine learning systems and then fitting a skeletal model to the body parts. Other approaches have involved calculating joint positions from images of a person again using trained machine learning systems. There is ongoing need to improve the accuracy and robustness of existing systems.

The embodiments described below are not limited to implementations which solve any or all of the disadvantages of known image processing systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Using high-level attributes to guide image processing is described. In an embodiment high-level attributes of images of people such as height, torso orientation, body shape, gender are used to guide processing of the images for various tasks including but not limited to joint position detection, body part classification, medical image analysis and others. In various embodiments one or more random decision forests are trained using images where global variable values such as player height are known in addition to ground-truth data appropriate for the image processing task concerned. In some examples sequences of images are used where global variables are static or vary smoothly over the sequence. In some examples one or more trained random decision forests are used to find global variable values as well as output values for the task concerned such as joint positions or body part classes.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a joint position detection system, the system described is provided as an example and not a limitation. As those skilled in the art will appreciate, the present examples are suitable for application in a variety of different types of image processing systems.

Figure 1:
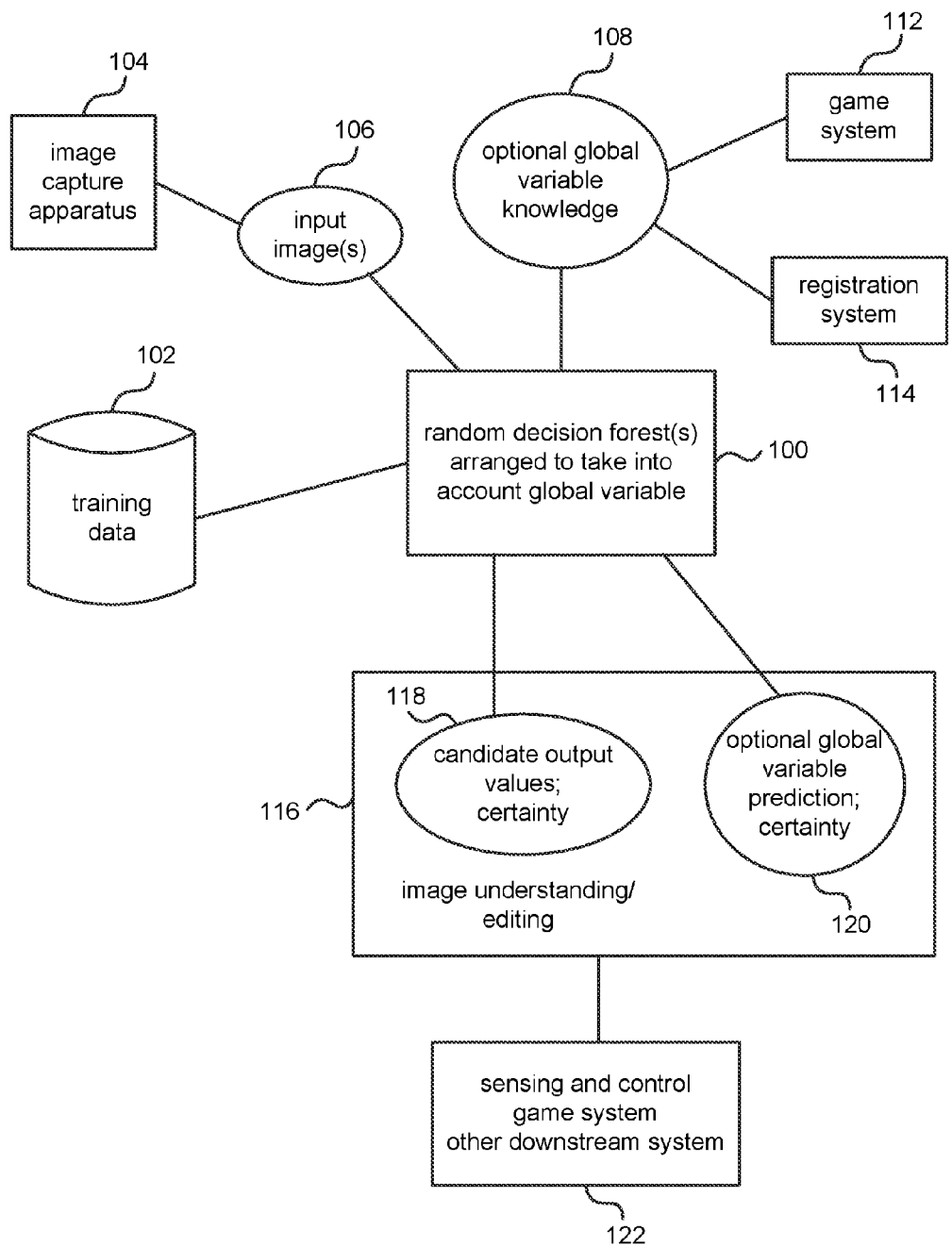
FIG. 1 is a schematic diagram of an image processing system.

FIG. 1 is a schematic diagram of an image processing system arranged to receive one or more input images 106 and process those to achieve a particular image processing task. For each image element of an input image the image processing system produces a classification or a probability distribution over candidate output values 118. What the candidate output values are depends on the image processing task concerned. For example, the input image 106 may be a depth image of a game player and the candidate output values may be joint positions. In another example, the input image 106 may be of a human hand and the candidate output values may be points on a canonical model of a hand which potentially corresponds to the image elements of the input image. In another example the input image may be a medical image and the candidate output values may classify the image elements of the input image according to body organs.

The image processing system is arranged to take into account one or more global variables of the input images 106. In this way improved accuracy is achieved for many practical applications. A global variable of an input image expresses a high-level attribute of that image. Examples of global variables include but are not limited to: person's height, person's torso orientation, person's body shape, person's gender. The particular global variable to be taken into account varies according to the image processing task and/or the application domain. In some embodiments described here prior knowledge 108 of a global variable value is available. In some embodiments global variable values 120 are calculated from the input image(s) optionally using any prior knowledge of the global variable values if available.

One or more random decision forest(s) 100 are trained using training data 102 comprising many varied example images appropriate for the image processing task. For example, in the case of joint position detection the training data 102 may comprise depth images of people with known joint positions. The random decision forest or forests are arranged to take into account a global variable and this may be achieved in a variety of ways as described in more detail below.

A random decision forest comprises one or more decision trees each having a root node, a plurality of split nodes and a plurality of leaf nodes. Observed data such as image elements of an image may be pushed through trees of a random decision forest from the root to a leaf node in a process whereby a decision is made at each split node. Associated with the leaf node that the image element reaches are one or more probability distributions over candidate output values.

The input image or images 106 may be of two or higher dimensions and may be depth images, color images, medical images, silhouette images, or any other type of digital image. The input image(s) 106 may comprise single images or sequences of images such as from a video camera or depth camera. In some examples the input images comprise stereo images from either a stereo camera or from multiple cameras at different view points. A silhouette image is a two dimensional binary image identifying foreground and background regions of a depth and/or color RGB image captured by an imaging sensor. In some examples a silhouette depth image may be thought of as a depth image flattened to a fixed depth. It is not essential for the image(s) 106 to be in the form of a regular grid. For example, laser range scanners or rolling shutter cameras may capture image data which is returned as one line scan of an image at a time. The input images may be captured by an image capture apparatus 104 such as a depth camera, video camera, medical imaging device, laser range scanner, or other image capture apparatus which may be static or mobile and may comprise more than one image capture device.

Global variable knowledge 108 is optionally available. For example, where the image processing system is used with a game system 112 the torso facing direction of a player may be known at particular points in a game. For example, in a golf game where a player is about to strike a ball. In other situations, players or other users may register with a registration system 114 and provide global variable values such as player height, player body shape, player gender. Where medical image processing tasks are involved global variable data may be available from medical records.

The output of the random decision forest(s) 110 are used for image understanding and/or image editing 116 and the outputs comprise candidate output values (such as a set of joint positions) and certainty information specifying how confident the candidate output values are. The output of the random decision forest(s) 110 optionally also comprises predicted global variable values 120 and certainty information specifying how confident the global variable values are. The outputs of the random decision forest(s) 110 may be used by any suitable downstream system such as a sensing and control application, game system, human computer interaction, medical system or others.

Figure 2:
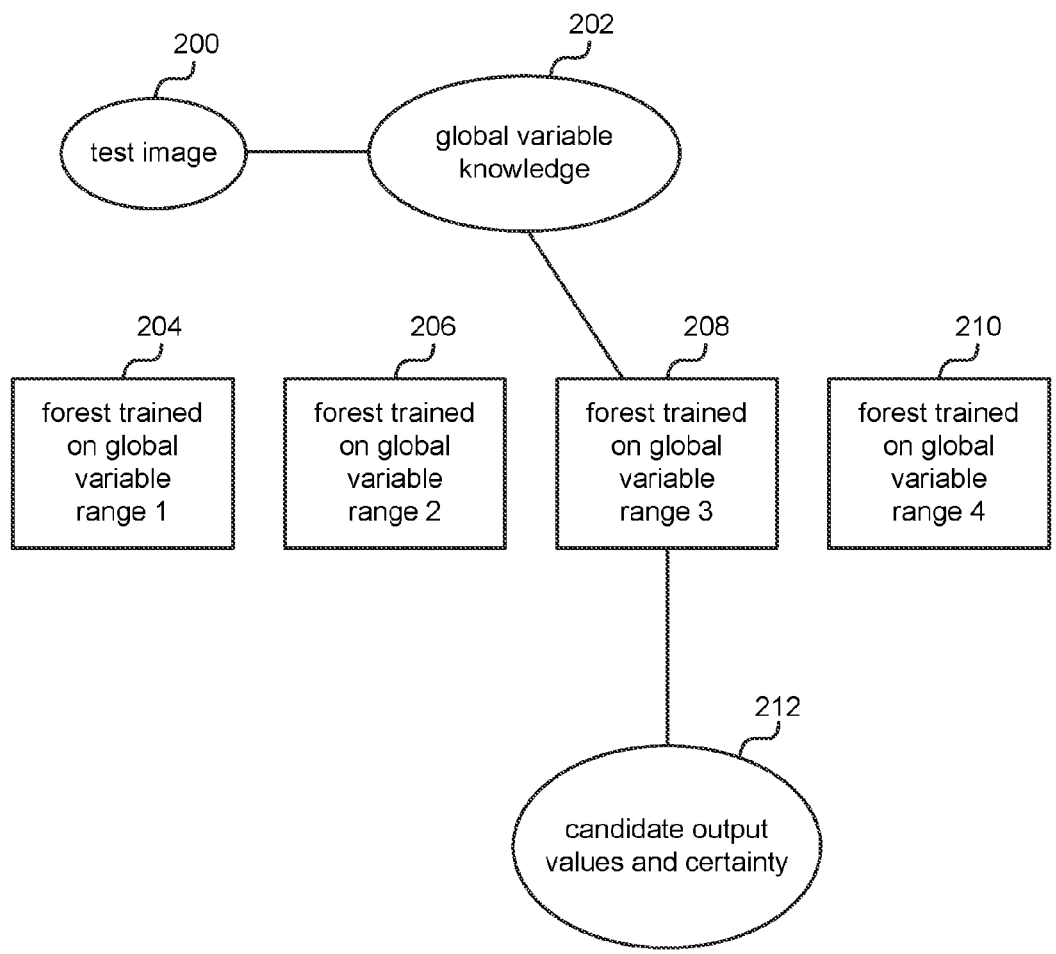
FIG. 2 is a schematic diagram of an example of the image processing system of FIG. 1 having a plurality of trained random decision forests.

In some examples the global variable is discretized by dividing a range of potential global variable values into bins. A separate random decision forest may be trained for each global variable bin as illustrated in FIG. 2. In other examples, one tree may be trained for each global variable bin. Any combination of trees and/or forests may be trained by global variable bin. In the FIG. 2 example four random decision forests 204, 206, 208, 210 are shown although other numbers of forests may be used depending on the application domain and the global variable concerned. For example, in the case of player height as the global variable four bins covering a total range from 0.5 m to 2 m may be used. In the case of torso orientation as the global variable more bins may be needed. Each random decision forest is trained using training data examples having global variable values which fall within one of the bins.

When a test image 200 of is received (that is, an image that has not been used for training) then global variable knowledge 202 for that test image 200 is used to select which of the trained forests to use. In the example of FIG. 2 the forest trained on global variable values in bin 3 is selected. Image elements of the test image are pushed through the selected forest to obtain candidate output values 212 and associated certainty information. This process is described in more detail with reference to FIG. 11 below. An image element is a pixel, voxel, group of pixels, group of voxels, blob, patch, or other component of an image.

Figure 3:
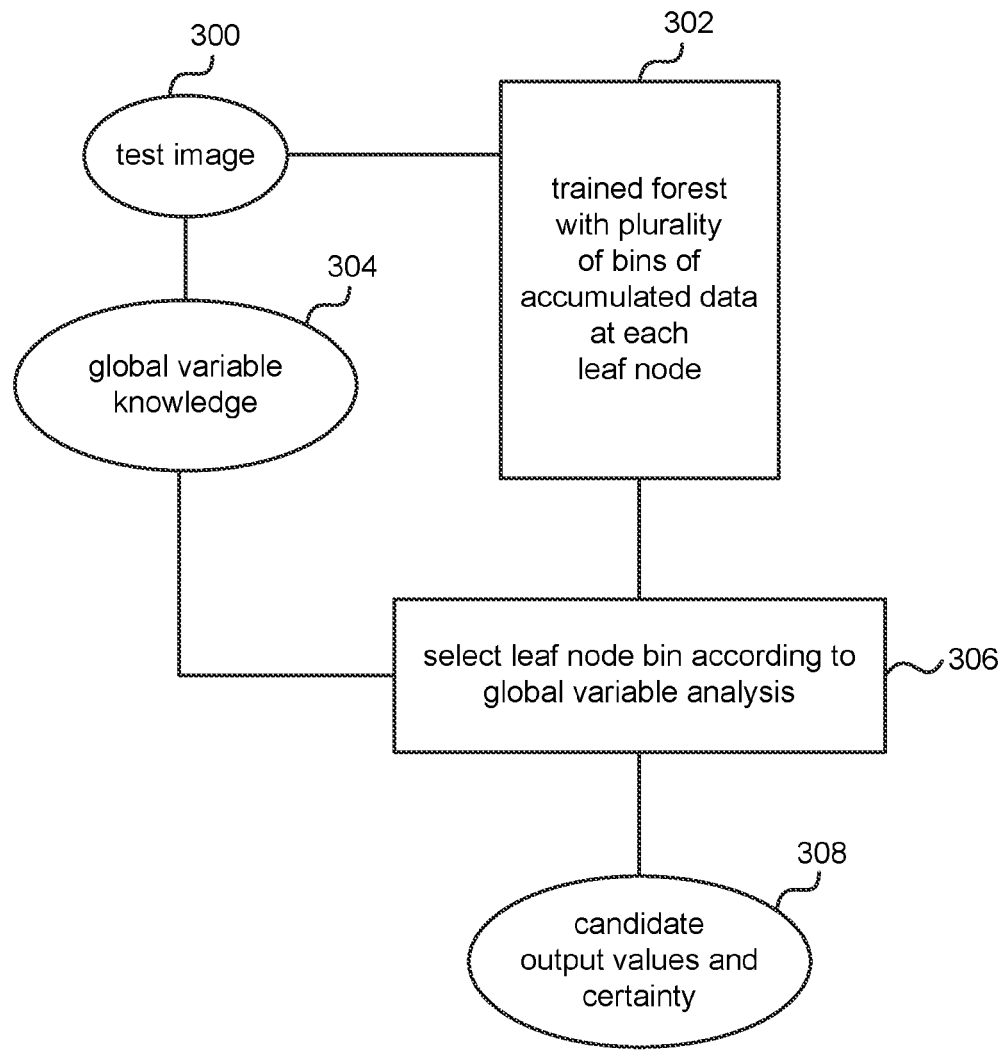
FIG. 3 is a schematic diagram of an example of the image processing system of FIG. 1 having a single trained random decision forest.

In the examples of FIGS. 2 and 3 the global variable knowledge may be obtained from the test image itself. For example, by pushing the test image through another random decision forest arranged to detect the global variable value. In other examples the global variable may be calculated from the test image, for example, by calculating the player height or in other ways.

In another example a single trained random decision forest 302 is used as illustrated in FIG. 3. The global variable range is again discretized into bins as for FIG. 2. As mentioned above, a random decision forest comprises a plurality of decision trees each having a root node, a plurality of split nodes and a plurality of leaf nodes. In this example, the trained random decision forest has a plurality of bins of accumulated data stored for each leaf node: one bin of accumulated data for each global variable bin.

Image elements of a test image 300 are pushed through the trained forest 302 and global variable knowledge 304 is used to select 306 which bins to access at the leaf nodes reached. The selected bins 306 are used to obtain candidate output values 308 (such as a set of joint positions) and certainty information.

In some examples where the global variable is discretized allowance is made for information that may be lost due to the discritization. This is achieved by considering all the bins and making a weighted combination of the results. For example, with reference to FIG. 4 a schematic random decision forest 302 is shown with four bins (represented by squares) associated with each leaf node. A test image element pushed through the tree proceeds down the shaded nodes (for example) to reach the shaded leaf node. The data stored in the bins associated with that leaf node 406 are combined using a weighted combination 400. The weights may have been learnt using a validation data set 404 for example. The weighted combination gives a set of candidate output values 402 and associated certainty information. Using the weighted combination in this way enables information from all global variable ranges to be taken into account appropriately. The system may store different weights for different prior information (such as from a user or a game system). For example, where a game system provides the orientation of a player (front, left, right, back) the system may store four different weights for these four situations.

Figure 5:
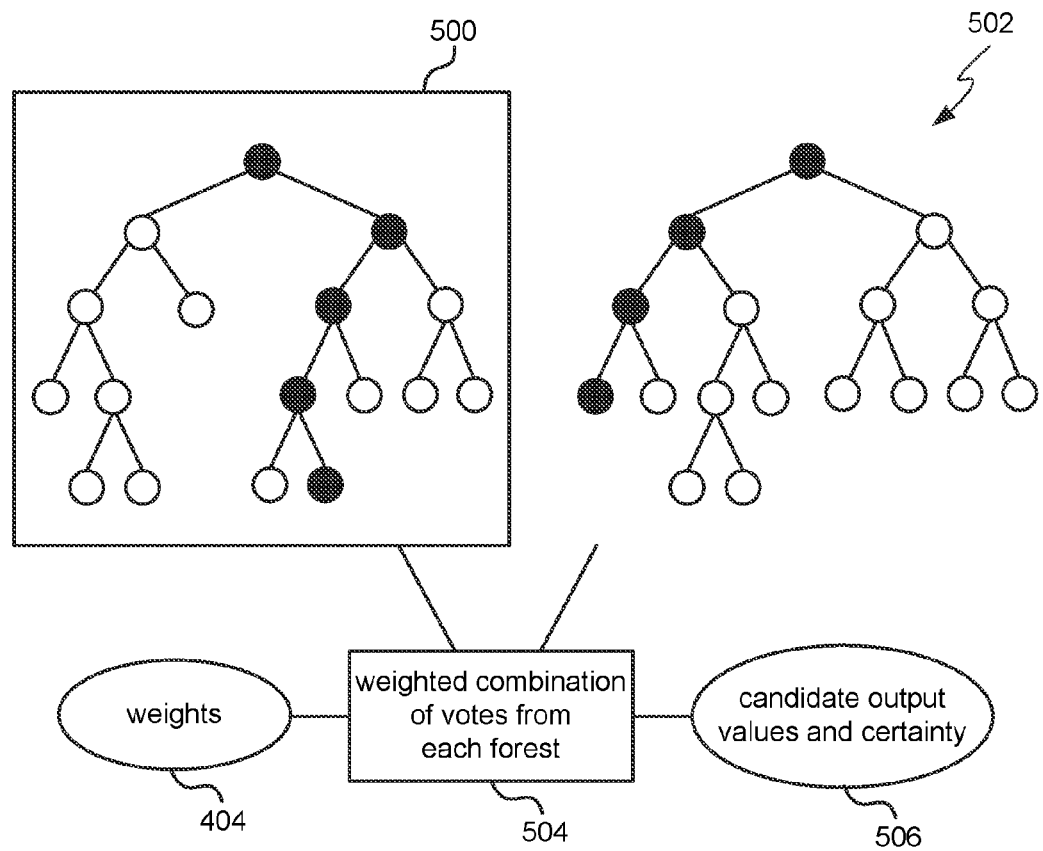
FIG. 5 is a schematic diagram of another example image processing system having a plurality of trained random decision forests.

In another example a weighted combination is made of data from a plurality of decision forests. With reference to FIG. 5 two random decision forests 500, 502 are illustrated schematically. In other examples additional trees and forests may be present. Image elements of a test image are pushed through both forests 500, 502 to find two leaf nodes. A weighted combination 504 of the candidate output values from the two leaf nodes may be made where the weights may be learnt using a validation set. The weighted combination 504 gives a set of candidate output values and certainty information 506.

Figure 4:
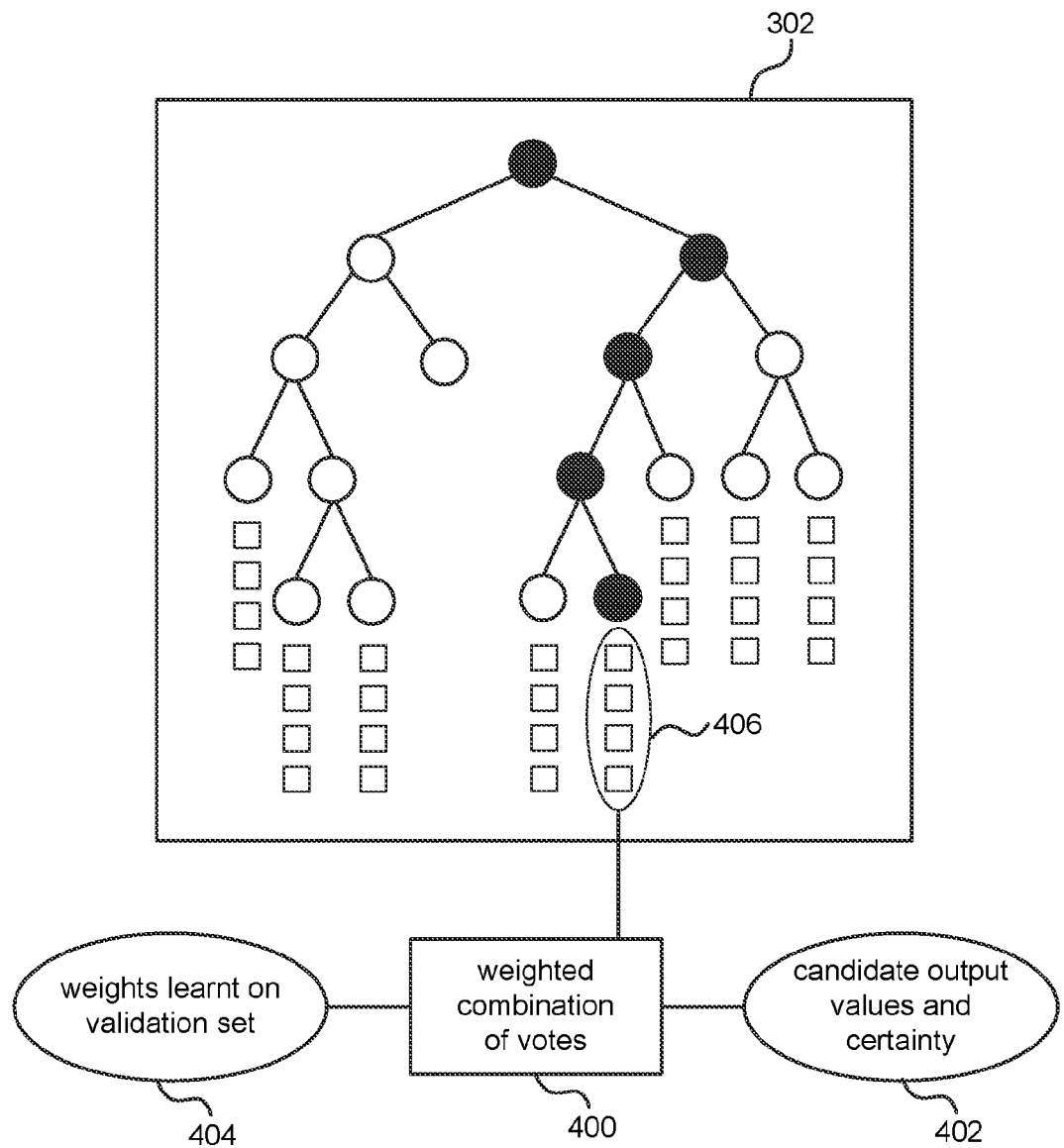
FIG. 4 is a schematic diagram of another example image processing system having a single trained random decision forest.

In the examples of FIG. 4 and FIG. 5 prior knowledge of the global variable value is unnecessary. However, any knowledge of the global variable may be used to adjust the weights for the weighted combination 400, 504.

In other examples a single random decision forest 602 is trained to jointly estimate a global variable and candidate output values. Image elements of a test image 600 are pushed through the trained forest 602 to obtain predictions 604 of both candidate values and global variable values; certainty information is available for both the candidate values and the global variable values. Here, prior knowledge of the global variable value for the test image 600 is unnecessary.

For example the forest has been trained using training data for which a global variable such as player orientation is known (front facing, left facing, right facing) and votes for candidate values have been stored at the leaf nodes. At test time an image element is pushed through the trained forest and the stored votes accessed from leaf nodes that the image element reaches. A plurality of mean-shift or other clustering processes may be carried out; one for each of the global variable states (e.g. front facing, left facing, right facing) to produce a set of candidate output values for each global variable state. The set of candidate output values which gives the optimal joint solution in terms of the candidate output values confidence and the global variable confidence is selected.

Where the global variable value is known or estimated, for example by using a random decision forest trained to make votes for global variable states (such as left facing, right facing, front facing), then the estimate of the global variable value may be used to select the appropriate candidate output values from the indexed leaf nodes so that only one mean-shift or other clustering process is needed.

Where the global variable value is estimated so that probabilities are found that the global variable takes a value in each of a plurality of states (e.g. front facing, right facing, left facing) then it is possible to use a marginalization or weighted combination of the votes where the weights are the probabilities. For example, given a test image of a player a trained random decision forest may be used to produce a global variable state probability that the orientation of the player is front facing, a probability that the player is right facing and a probability that the player is left facing. One or more random decision forests may have been trained using training images where the global variable values are known. The candidate output values obtained from the indexed leaf nodes at test time are then aggregated over each global variable state using mean shift or another clustering or aggregation process. The resulting sets of candidate output values are then combined using a marginalization such as a weighted aggregation where the weights are related to the global variable state probabilities.

In the examples described herein a random decision forest is trained using training data where a global variable is known. At test time the trained forest is used to find leaf node indexes which have stored candidate output values and certainty information. Those candidate output values and the certainty information is used to select a set of candidate output values as either: a most confident set of candidate output values over the global variable and the candidate output values jointly; or a most confident set of candidate output values given an estimate of the global variable; or a weighted combination (marginalization) of the candidate output values given an estimate of the global variable.

In some examples the input comprises a stream of test images 700 which may be a live stream although that is not essential. For example, a stream of depth images or silhouette depth images of a game player. A current image in the stream is taken 702 and analyzed to find a value of a global variable such as player height or any other global variable which is expected to remain static or vary smoothly over the stream. A running average of the global variable is updated 704. Any of the direct learning methods of FIGS. 1 to 4 are then used with the current running average taken as the global variable knowledge. This gives a set of candidate output values and certainty information 708. The method may repeat for the next image in the stream 702. By maintaining a running average of the global variable value it is possible to learn a global variable value which is expected to remain static or vary smoothly over the stream.

In another example a sequence 800 of images is available as input. For example this may be a video sequence, a sequence of depth images, a sequence of medical images or any other image sequence where the whole sequence is available for analysis. A single random decision forest 802 is trained to jointly estimate a global variable and candidate output values over all images in the sequence. The images here are sometimes referred to as frames. The global variable is assumed to be static or to vary smoothly. The output comprises, for each frame, a global variable value and candidate output values (e.g. set of joint positions).

In the examples described above a single global variable is considered. However, the methods are also applicable where more than one global variable is used. In examples where weighted combinations of candidate output values are made then additional weights may be learnt as additional global variable are considered.

Figure 9:
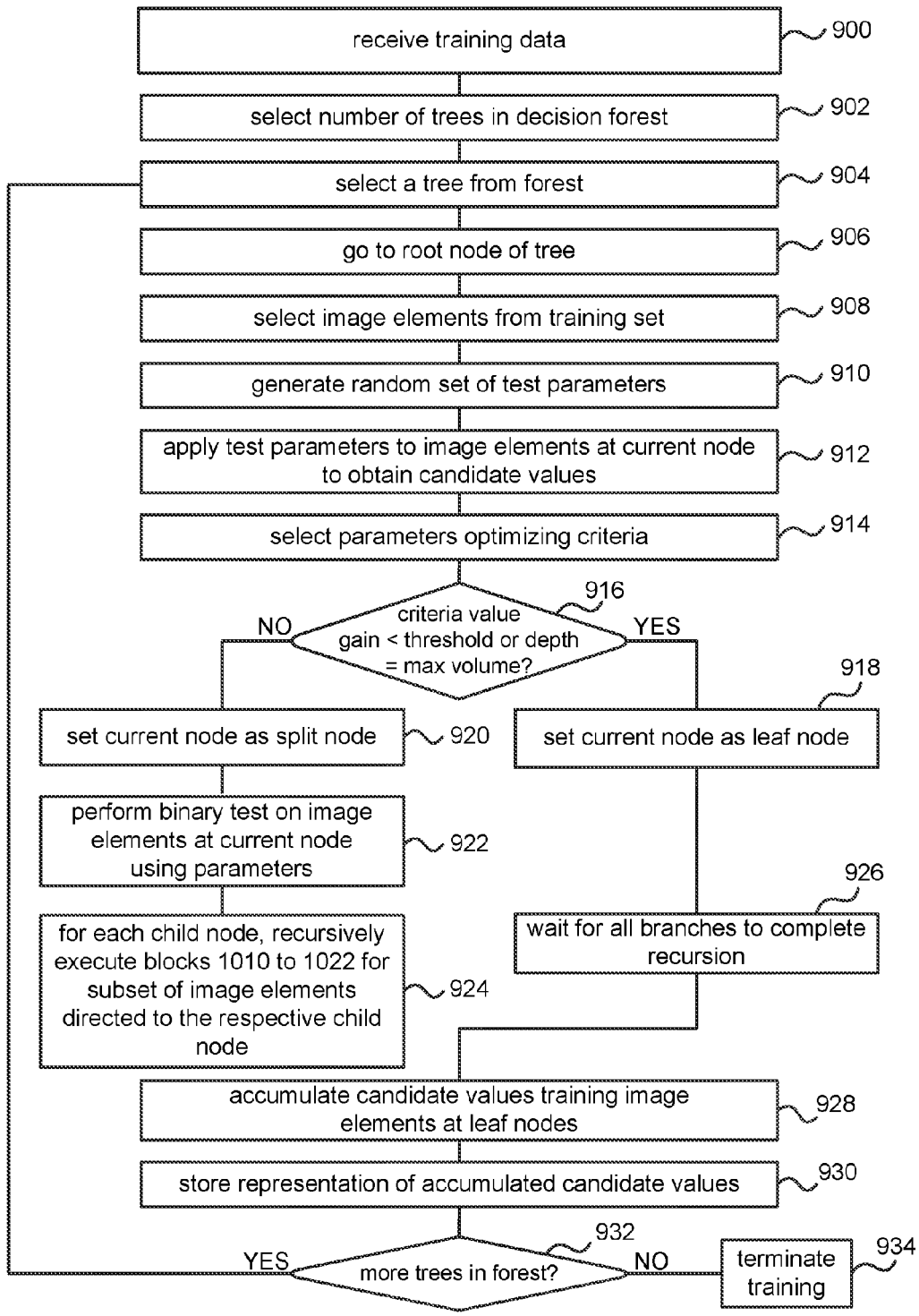
FIG. 9 is a flow diagram of a method of training a random decision forest.

An example of a method of training a random decision forest is now given with respect to FIG. 9. The decision forest is trained using a set of training images which are appropriate for the image processing task concerned and which form a ground-truth database. In the case of joint position detection the training images may comprise depth images of people where the joint positions are known and where a value of a global variable such as person's height is known. In the examples where the global variable values are discretized into bins the training data is also divided according to the global variable bin ranges.

Referring to FIG. 9, to train the decision trees, the training data described above is first received 900. The number of decision trees to be used in a random decision forest is selected 902. A random decision forest is a collection of deterministic decision trees. Decision trees may be used in classification or regression algorithms, but may suffer from over-fitting, i.e. poor generalization. However, an ensemble of many randomly trained decision trees (a random forest) yields improved generalization. During the training process, the number of trees is fixed.

Figure 6:
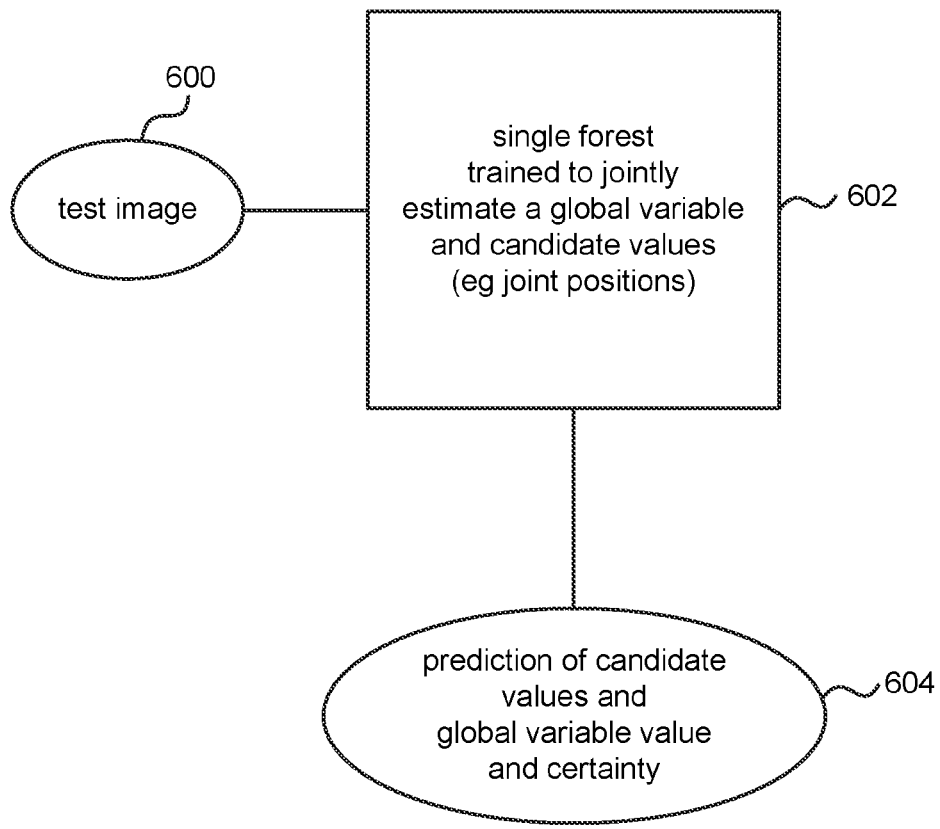
FIG. 6 is a schematic diagram of an image processing system having a single random decision forest trained to jointly estimate a global variable and candidate values such as joint position.
Figure 7:
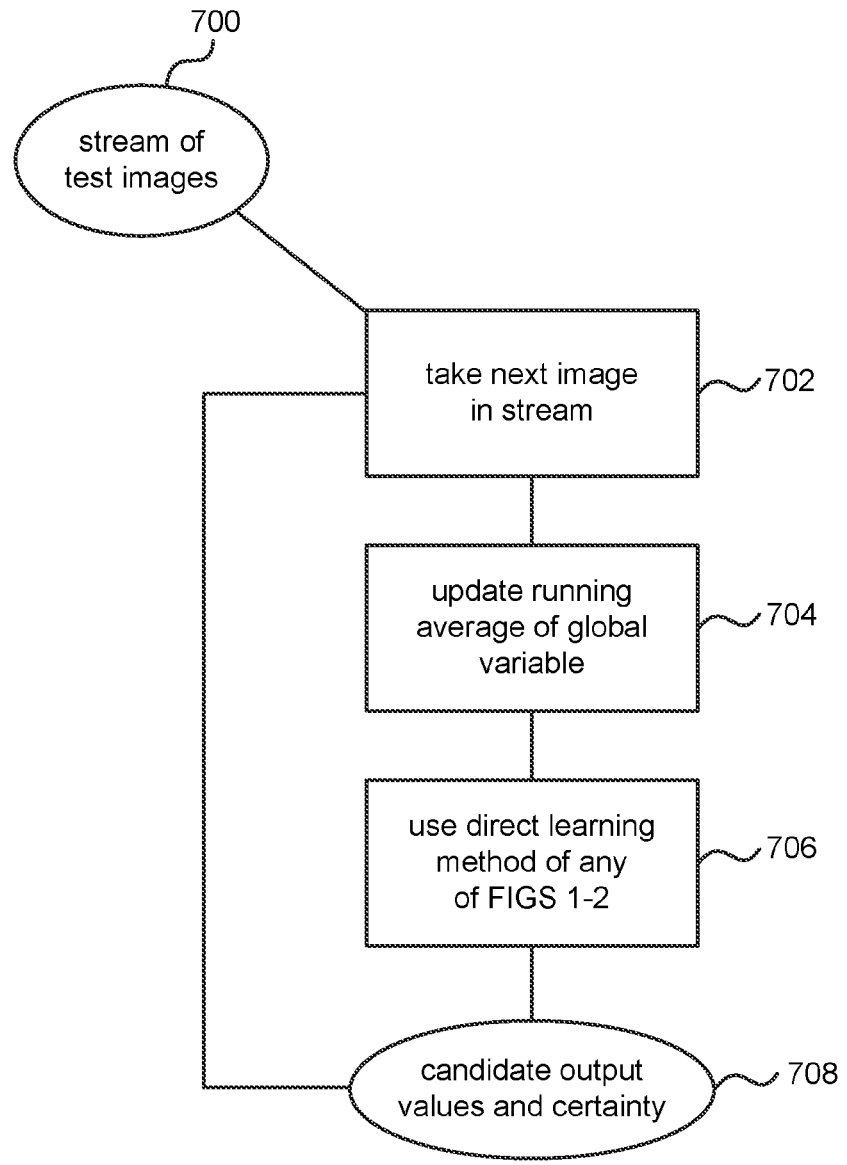
FIG. 7 is a schematic diagram of an image processing system for operation on a stream of images.
Figure 8:
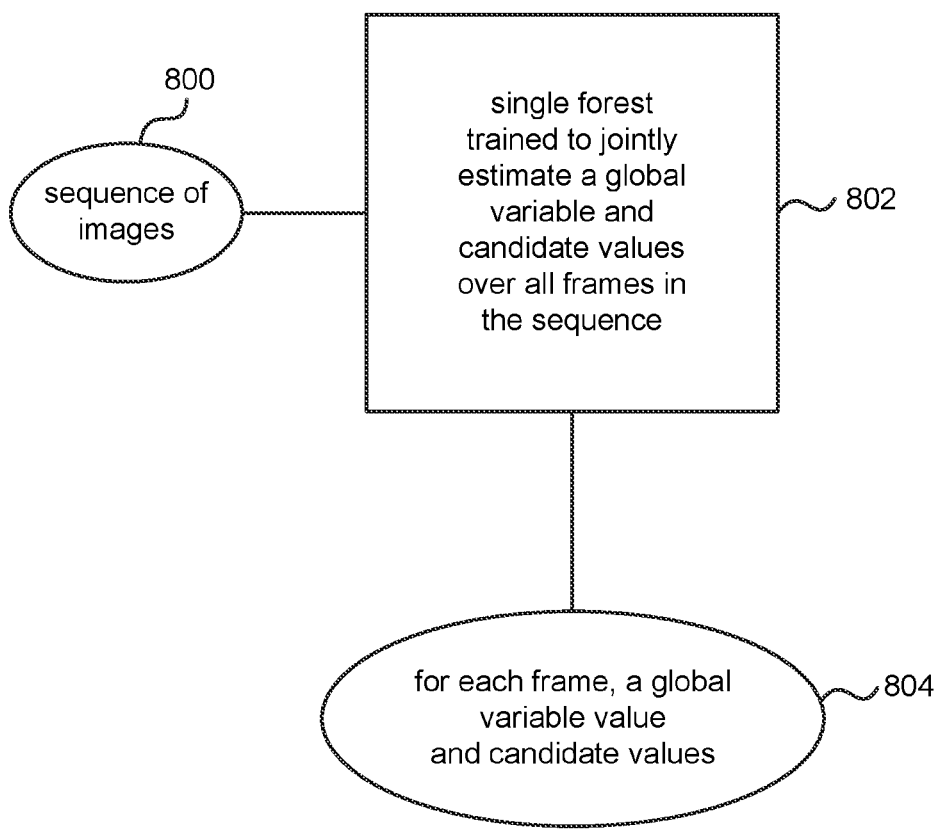
FIG. 8 is a schematic diagram of an image processing system for operation on a historical sequence of images.

In operation, each root and split node of each tree performs a binary test on the input data and based on the result directs the data to the left or right child node. The leaf nodes do not perform any action; they store accumulated candidate output values (and global variable predictions in the embodiments described above with reference to FIGS. 6 and 8). In the case of joint position detection the candidate output values are joint offset vectors representing a distance and direction of an image element from a joint position. For example, probability distributions may be stored representing the accumulated candidate output values.

The manner in which the parameters used by each of the split nodes are chosen and how the leaf node probabilities may be computed is now described. A decision tree from the decision forest is selected 904 (e.g. the first decision tree) and the root node is selected 906. At least a subset of the image elements from each of the training images are then selected 908.

A random set of test parameters are then generated 910 for use by a binary test performed at the root node as candidate features. In one example, the binary test is of the form: $\xi > f(x; \theta) > \tau$, such that $f(x; \theta)$ is a function applied to image element x with parameters $\theta$, and with the output of the function compared to threshold values $\xi$ and $\tau$. If the result of $f(x; \theta)$ is in the range between $\tau$ and $\tau$ then the result of the binary test is true. Otherwise, the result of the binary test is false. In other examples, only one of the threshold values and $\tau$ may be used, such that the result of the binary test is true if the result of $f(x; \theta)$ is greater than (or alternatively less than) a threshold value. In the example described here, the parameter $\theta$ defines a feature of the image.

A candidate function $f(x; \theta)$ may make use of image information which is available at test time. The parameter $\theta$ for the function $f(x; \theta)$ is randomly generated during training. The process for generating the parameter $\theta$ may comprise generating random spatial offset values in the form of a two or three dimensional displacement. The result of the function $f(x; \theta)$ is then computed by observing the depth value (or color value in the case of color images) for a test image element which is displaced from the image element of interest x in the image by the spatial offset. The spatial offsets are optionally made depth invariant (where depth images are used) by scaling by 1/depth of the image element of interest.

The result of the binary test performed at a root node or split node determines which child node an image element is passed to. For example, if the result of the binary test is true, the image element is passed to a first child node, whereas if the result is false, the image element is passed to a second child node.

The random set of test parameters generated comprise a plurality of random values for the function parameter $\theta$ and the threshold values $\tau$ and $\tau$. In order to inject randomness into the decision trees, the function parameters $\theta$ of each split node are optimized only over a randomly sampled subset $\Theta$ of all possible parameters. This is an effective and simple way of injecting randomness into the trees, and increases generalization.

Then, every combination of test parameter may be applied 912 to each image element in the set of training images. In other words, available values for $\theta$ (i.e. $\theta_i \in \Theta$) are tried one after the other, in combination with available values of $\xi$ and $\tau$ for each image element in each training image. For each combination, criteria (also referred to as objectives) are calculated 914. In an example, the calculated criteria comprise the information gain (also known as the relative entropy). The combination of parameters that optimize the criteria (such as maximizing the information gain (denoted $\theta^*$, $\xi^*$ and $\tau^*$)) is selected 914 and stored at the current node for future use. As an alternative to information gain, other criteria may be used, such as variance reduction, Gini entropy, the 'two-ing' criterion or others depending on the particular application domain.

It is then determined 916 whether the value for the calculated criteria is less than (or greater than) a threshold. If the value for the calculated criteria is less than the threshold, then this indicates that further expansion of the tree does not provide significant benefit. This gives rise to asymmetrical trees which naturally stop growing when no further nodes are beneficial. In such cases, the current node is set 918 as a leaf node. Similarly, the current depth of the tree is determined (i.e. how many levels of nodes are between the root node and the current node). If this is greater than a predefined maximum value, then the current node is set 918 as a leaf node. Each leaf node has candidate output values which accumulate at that leaf node during the training process as described below.

It is also possible to use another stopping criterion in combination with those already mentioned. For example, to assess the number of example image elements that reaches the leaf. If there are too few examples (compared with a threshold for example) then the process may be arranged to stop to avoid overfitting. However, it is not essential to use this stopping criterion.

If the value for the calculated criteria is greater than or equal to the threshold, and the tree depth is less than the maximum value, then the current node is set 920 as a split node. As the current node is a split node, it has child nodes, and the process then moves to training these child nodes. Each child node is trained using a subset of the training image elements at the current node. The subset of image elements sent to a child node is determined using the parameters that optimized the criteria. These parameters are used in the binary test, and the binary test performed 922 on all image elements at the current node. The image elements that pass the binary test form a first subset sent to a first child node, and the image elements that fail the binary test form a second subset sent to a second child node.

For each of the child nodes, the process as outlined in blocks 910 to 922 of FIG. 9 are recursively executed 924 for the subset of image elements directed to the respective child node. In other words, for each child node, new random test parameters are generated 910, applied 912 to the respective subset of image elements, parameters optimizing the criteria selected 914, and the type of node (split or leaf) determined 916. If it is a leaf node, then the current branch of recursion ceases. If it is a split node, binary tests are performed 922 to determine further subsets of image elements and another branch of recursion starts. Therefore, this process recursively moves through the tree, training each node until leaf nodes are reached at each branch. As leaf nodes are reached, the process waits 926 until the nodes in all branches have been trained. Note that, in other examples, the same functionality may be attained using alternative techniques to recursion.

Once all the nodes in the tree have been trained to determine the parameters for the binary test optimizing the criteria at each split node, and leaf nodes have been selected to terminate each branch, then candidate output values may be accumulated 928 at the leaf nodes of the tree. This is the training stage and so particular image elements which reach a given leaf node have specified output values and global variables known from the ground truth training data. A representation of the accumulated candidate output values may be stored 930 using various different methods. The candidate output values may be stored according to global variable bin ranges as described above with reference to FIGS. 3 and 4. Optionally sampling may be used to select candidate output values to be accumulated and stored in order to maintain a low memory footprint. For example, reservoir sampling may be used whereby a fixed maximum sized sample of candidate values is taken. Selection may be random or in any other manner.

The candidate values may optionally be filtered to remove outliers using a threshold which may be learnt using a validation set of data. The accumulated candidate values may be stored as raw data or a sample of the accumulated candidate values may be stored. A histogram of the accumulated candidate values may be stored or the output values may be aggregated (within each bin range where appropriate) by taking a mean, median, mode or other form of aggregation. In some examples a multi-modal distribution is fitted to the accumulated candidate values. This enables application domains involving modifiable entities in which the data is found to be multi-modal to be accommodated well. In an example a mean shift mode detection process is used to cluster the candidate values and a weight is stored for each cluster or mode according to the number of candidate values that reached a particular mode. It is not essential to use a mean shift mode detection process; other clustering processes may be used. Mean shift mode detection is an algorithm that efficiently detects the modes (peaks) in a distribution defined by a kernel density estimator. A kernel density estimator is a non-parametric process for estimating a probability density function, in this case of the accumulated candidate output values.

Once the accumulated candidate values have been stored it is determined 932 whether more trees are present in the decision forest. If so, then the next tree in the decision forest is selected, and the process repeats. If all the trees in the forest have been trained, and no others remain, then the training process is complete and the process terminates 934.

Therefore, as a result of the training process, one or more decision trees are trained. Each tree comprises a plurality of split nodes storing optimized test parameters, and leaf nodes storing associated candidate output values or representations of aggregated candidate output values. Due to the random generation of parameters from a limited subset used at each node, the trees of the forest are distinct (i.e. different) from each other.

The methods described above with reference to FIG. 9 comprise forming the structure of the trees in the forest as well as accumulating, clustering and storing the data associated with the leaf nodes. In some examples it is possible to use a known forest and/or tree structures and during training pass the training images through the structure to form new data associated with the leaf nodes where that data is specific for the image processing task required.

Figure 10:
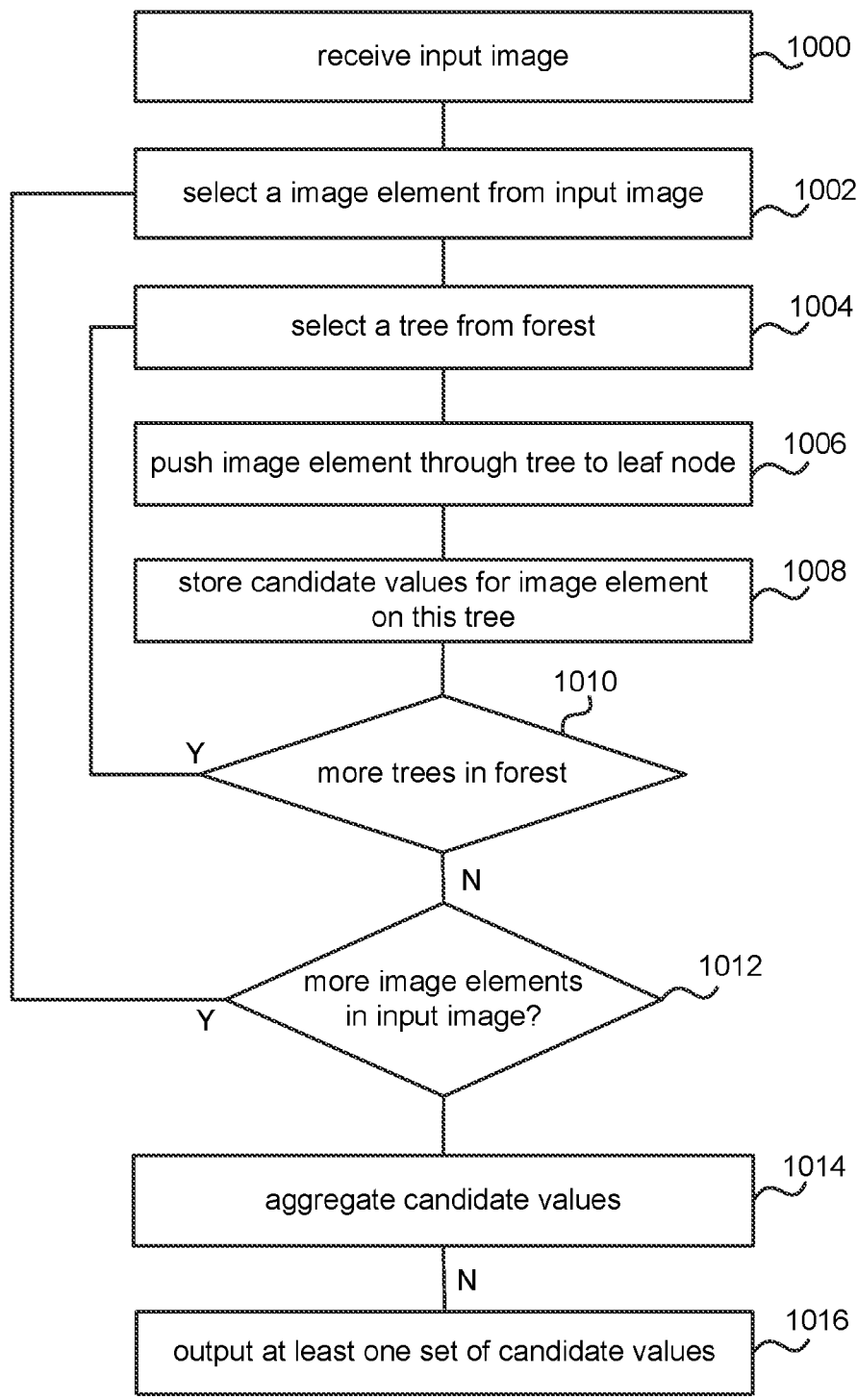
FIG. 10 is a flow diagram of a method of using a trained random decision forest.

FIG. 10 illustrates a flowchart of a process for carrying out inference using a decision forest that has been trained as described hereinabove. This method may also be used for any image processing tasks where the random decision forest has been appropriately trained as described above.

An image element from the input image is selected 1002. A trained decision tree from the decision forest is also selected 1004. The selected image element is pushed 1006 through the selected decision tree, such that it is tested against the trained parameters at a node, and then passed to the appropriate child in dependence on the outcome of the test, and the process repeated until the image element reaches a leaf node. Once the image element reaches a leaf node, the accumulated candidate values (from the training stage) and any global variable candidate values associated with this leaf node are stored 1008 for this image element. Weighted combinations of candidate values may be stored where the global variables are discretized as described above with reference to FIGS. 4 and 5.

If it is determined 1010 that there are more decision trees in the forest, then a new decision tree is selected 1004, the image element pushed 1006 through the tree and the accumulated candidate output values stored 1008. This is repeated until it has been performed for all the decision trees in the forest. Note that the process for pushing an image element through the plurality of trees in the decision forest may also be performed in parallel, instead of in sequence as shown in FIG. 10. A weighted combination of the candidate values from different trees and/or forests may be made where the global variables are discretized as described above.

It is then determined 1012 whether further unanalyzed image elements are present in the input depth image, and if so another image element is selected and the process repeated. Once all the image elements in the input image have been analyzed, then candidate output values are obtained for all image elements.

As the image elements are pushed through the trees in the decision forest, candidate output values accumulate. These accumulated candidate values are aggregated 1014 to form an overall candidate value for each image element. Optionally a sample of candidate values may be taken for aggregation. For example, N candidates may be chosen at random, or by taking the top N weighted candidates, and then the aggregation process applied only to those N candidates. This enables accuracy to be traded off against speed.

At least one set of candidate output values (e.g. a set of joint positions) may then be output 1016. More than one output image may be output; for example, where there is uncertainty.

Figure 11:
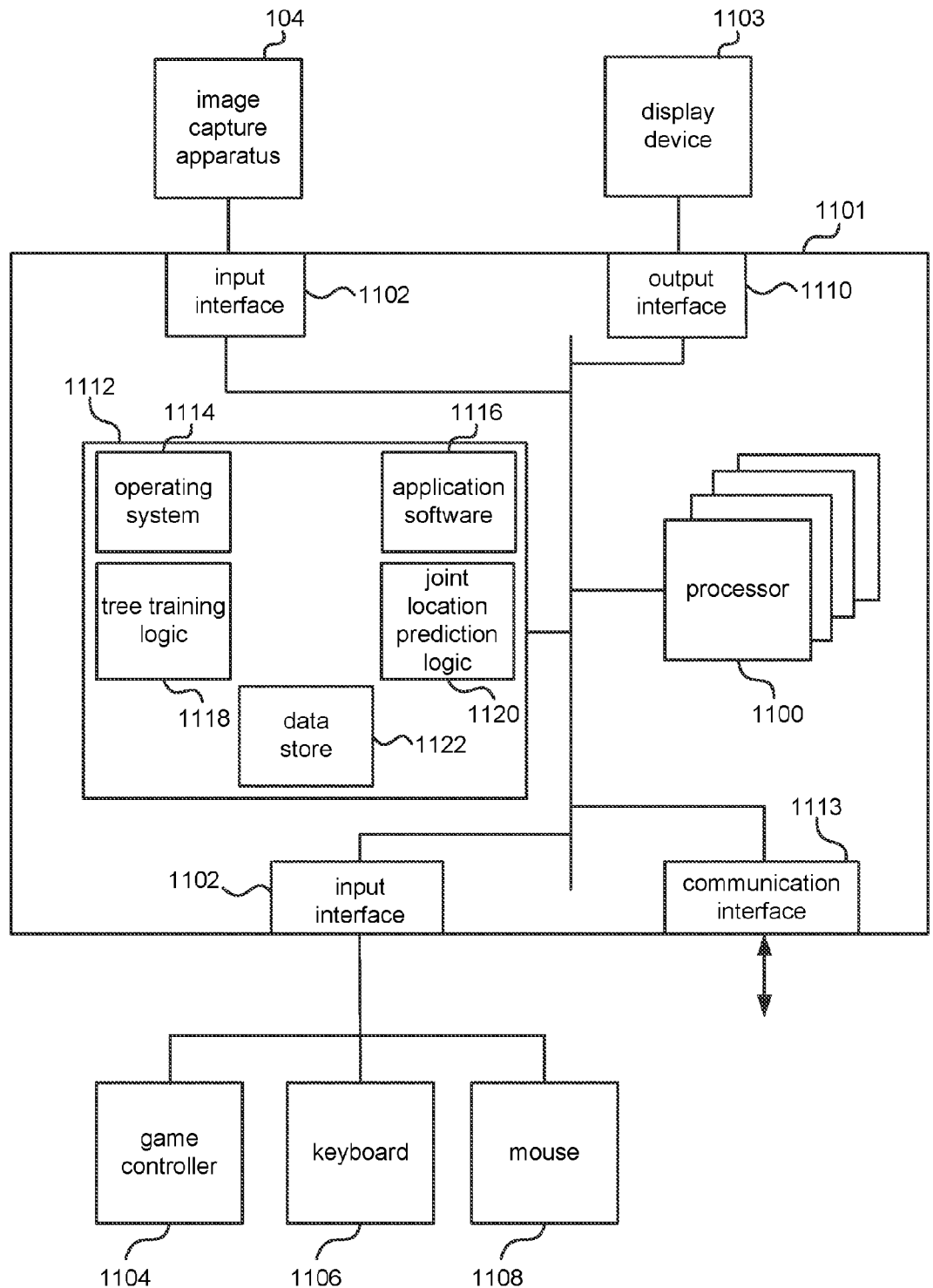
FIG. 11 illustrates an exemplary computing-based device in which embodiments of an image processing system may be implemented.

FIG. 11 illustrates various components of an exemplary computing-based device 1101 which may be implemented as any form of a computing and/or electronic device, and in which embodiments of an image processing system may be implemented.

The computing-based device 1101 comprises an input interface 1102 which may be arranged to receive input from an image capture apparatus 104 and optionally to enable the image capture apparatus to be controlled. The input interface 1102 may also receive input from and optionally control any one or more of a game controller 1104, a keyboard 1106 and a mouse 1108. An output interface 1110 may be provided to enable output images and other output to be displayed at a display device 1103 of any type. The display device may act as an input in the case that it is a touch screen for example. The device also comprises communication interface 1113 which enables the device to communicate with other entities over a communications network of any type.

Computing-based device 1101 also comprises one or more processors 1100 which may be microprocessors, controllers or any other suitable type of processors for processing computer executable instructions to control the operation of the device in order to process images. In some examples, for example where a system on a chip architecture is used, the processors 1100 may include one or more fixed function blocks (also referred to as accelerators) which implement a part of the method of image processing, training random decision forest(s) and carrying out inference using trained random decision forests in hardware (rather than software or firmware). Platform software comprising an operating system 1114 or any other suitable platform software may be provided at the computing-based device to enable application software 1116 to be executed on the device.

The computer executable instructions may be provided using any computer-readable media that is accessible by computing based device 1101. Computer-readable media may include, for example, computer storage media such as memory 1112 and communications media. Computer storage media, such as memory 1112, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 1112) is shown within the computing-based device 1101 it will be appreciated that the storage may be distributed or located remotely and accessed via a network or other communication link (e.g. using communication interface 1113).

An output is also provided such as an audio and/or video output to a display system integral with or in communication with the computing-based device. The display system may provide a graphical user interface, or other user interface of any suitable type although this is not essential.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method of processing an image having at least one high-level attribute, the method comprising:
  accessing at least one random decision forest arranged to take into account the high-level attribute by virtue of having been trained using training images for which values of at least one global variable expressing the high-level attribute are known;
  for each of a plurality of image elements of the image, pushing the image element through the random decision forest to obtain candidate output values and, information about the certainty of the candidate output values;

using the candidate output values and certainty information to select a set of candidate output values as either: a most confident set of candidate output values over the global variable and the candidate output values jointly; or a most confident set of candidate output values given an estimate of the global variable; or a weighted combination of the candidate output values given an estimate of the global variable;

the method further comprising:
receiving the image as part of a stream of images, calculating a running average value of the global variable of the image and using the calculated value to influence how the candidate output values are obtained, receiving subsequent images from the stream of images and repeating the calculating and influencing for each subsequent image; or receiving a sequence of images comprising the image and wherein receiving the random decision forest comprises receiving a single random decision forest trained to jointly estimate the global variable and the candidate output values over all images in the sequence.

2. A method as claimed in claim 1 comprising accessing a plurality of random decision forests each having been trained using training images for which the global variable is in a different range; and either selecting one of the random decision forests for pushing the image elements through using knowledge of a value of the global variable of the image, or pushing the image elements through all the random decision forests and making a weighted combination of candidate output values from each of the random decision forests.

3. A method as claimed in claim 2 comprising calculating a value of the global variable of the image.

4. A method as claimed in claim 3 comprising obtaining the candidate output values by either selecting one of a plurality of bins according to knowledge of a value of the global variable of the image; or making a weighted combination of candidate output values from each of the bins.

5. A method as claimed in claim 4 comprising pushing the image elements through the random decision forest to obtain both candidate output values and a global variable value.

6. A method as claimed in claim 1 wherein accessing the random decision forest comprises accessing a plurality of bins of candidate output values associated with a leaf node of the random decision forest, each bin holding candidate output values associated with a specified range of values of the global variable.

7. A method as claimed in claim 1 wherein accessing the random decision forest comprises accessing a random decision forest which has been trained to jointly estimate the global variable and the candidate output values.

8. A method as claimed in claim 1 comprising receiving the image as part of a stream of images; calculating a running average value of the global variable of the image and using the calculated value to influence how the candidate output values are obtained; receiving subsequent images from the stream of images and repeating the calculating and influencing for each subsequent image.

9. A method as claimed in claim 1 comprising receiving a sequence of images comprising the image and wherein receiving the random decision forest comprises receiving a single random decision forest trained to jointly estimate the global variable and the candidate output values over all images in the sequence.

10. A method as claimed in claim 1, selecting a set of candidate output values comprising aggregating a sample of candidate output values to form an overall candidate value for an image element.

11. A computer-implemented method of processing an image having at least one high-level attribute, the method comprising:
training at least one random decision forest using training images for which values of at least one global variable expressing the high-level attribute are known, the training being such that the random decision forest is able to take into account the high-level attribute, each of the at least one random decision forests having been trained using images for which the global variable is in a different range;

for each of a plurality of image elements of the image:
pushing the image element through one of the at least one random decision forests, the random decision forest being selected using knowledge of a value of the global variable of the image, to obtain candidate output values and information about the certainty of the candidate output values; or
pushing the image element through all of the at least one random decision forests and making a weighted combination of candidate output values from each of the random decision forests;

using the candidate output values and certainty information to select a set of candidate output values as either: a most confident set of candidate output values over the global variable and the candidate output values jointly; or a most confident set of candidate output values given an estimate of the global variable; or a weighted combination of the candidate output values given an estimate of the global variable; and learning weights for the weighted combination of candidate output values from a validation set of training images.

12. A method as claimed in claim 11 comprising training the random decision forest by at least populating a plurality of bins of candidate output values associated with each leaf node of the random decision forest, each bin holding candidate output values associated with a specified range of values of the global variable.

13. A method as claimed in claim 11 comprising training the random decision forest to jointly estimate the global variable and the candidate output values.

14. A method as claimed in claim 11 comprising training the random decision forest to jointly estimate the global variable and the candidate output values over all images in a sequence of images over which the global variable is static or varies smoothly.

15. A method as claimed in claim 11, training the random decision forest further comprising filtering candidate output values to remove outliers using threshold values learned using a validation set of data.

16. An image processing system comprising:
at least one random decision forest arranged to take into account a high-level attribute of an image by virtue of having been trained using training images for which values of at least one global variable expressing the high-level attribute are known;
a processor, arranged to push each of a plurality of image elements of the image through the random decision forest to obtain candidate output values and information about the certainty of the candidate output values;
the processor being arranged to use the candidate output values and certainty information to select a set of candidate output values as either: a most confident set of candidate output values over the global variable and the candidate output values jointly;

or a most confident set of candidate output values given an estimate of the global variable; or a weighted combination of the candidate output values given an estimate of the global variable;

the processor being further arranged to:

receive the image as part of a stream of images; calculate a running average value of the global variable of the image and use the calculated value to influence how the candidate output values are obtained; receive subsequent images from the stream of images and repeat the calculating and influencing for each subsequent image; or receive a sequence of images comprising the image and wherein the random decision forest comprises a single random decision forest trained to jointly estimate the global variable and the candidate output values over all images in the sequence.

17. An image processing system as claimed in claim 16 comprising a plurality of random decision forests each having been trained using training images for which the global variable is in a different range; the processor being arranged to either select one of the random decision forests for pushing the image elements through using knowledge of a value of the global variable of the image, or to push the image elements through all the random decision forests and make a weighted combination of candidate output values from each of the random decision forests.

18. A system as claimed in claim 16 wherein the random decision forest comprises a plurality of bins of candidate output values associated with each leaf node of the random decision forest, each bin holding candidate output values associated with a specified range of values of the global variable.

19. A system as claimed in claim 16 wherein the random decision forest has been trained to jointly estimate the global variable and the candidate output values.

20. A system as claimed in claim 16 wherein the random decision forest has been trained to jointly estimate the global variable and the candidate output values over each frame of a sequence of images.

* * * * *